(12) United States Patent
Bustos et al.

(10) Patent No.: US 9,234,071 B2
(45) Date of Patent: Jan. 12, 2016

(54) AQUEOUS DISPERSIONS AND THEIR USE FOR THE PRODUCTION OF SHEET-LIKE SUBSTRATES

(75) Inventors: Nidia Bustos, Mannheim (DE); Jürgen Weiser, Schriesheim (DE)

(73) Assignee: BASF SE (DE)

( * ) Notice: Subject to any disclaimer, the term of this patent is extended or adjusted under 35 U.S.C. 154(b) by 1309 days.

(21) Appl. No.: 12/532,249

(22) PCT Filed: Mar. 14, 2008

(86) PCT No.: PCT/EP2008/053077
§ 371 (c)(1),
(2), (4) Date: Sep. 21, 2009

(87) PCT Pub. No.: WO2008/113755
PCT Pub. Date: Sep. 25, 2008

(65) Prior Publication Data
US 2010/0119775 A1 May 13, 2010

(30) Foreign Application Priority Data

Mar. 21, 2007 (EP) .................................... 07104557
Mar. 26, 2007 (EP) .................................... 07104899

(51) Int. Cl.
| | | |
|---|---|---|
| C08G 18/79 | (2006.01) | |
| C08G 18/08 | (2006.01) | |
| C08G 18/28 | (2006.01) | |
| C08G 18/32 | (2006.01) | |
| C08G 18/38 | (2006.01) | |
| C08G 18/42 | (2006.01) | |
| C08G 18/66 | (2006.01) | |
| C08G 18/72 | (2006.01) | |
| C09D 175/04 | (2006.01) | |
| C14C 11/00 | (2006.01) | |
| D06M 15/564 | (2006.01) | |
| D06M 23/12 | (2006.01) | |
| C08L 75/04 | (2006.01) | |
| C08L 83/00 | (2006.01) | |

(52) U.S. Cl.
CPC .......... *C08G 18/792* (2013.01); *C08G 18/0823* (2013.01); *C08G 18/283* (2013.01); *C08G 18/3206* (2013.01); *C08G 18/3821* (2013.01); *C08G 18/4216* (2013.01); *C08G 18/664* (2013.01); *C08G 18/6692* (2013.01); *C08G 18/722* (2013.01); *C09D 175/04* (2013.01); *C14C 11/006* (2013.01); *D06M 15/564* (2013.01); *D06M 23/12* (2013.01); *C08L 75/04* (2013.01); *C08L 83/00* (2013.01); *Y10T 428/24438* (2015.01); *Y10T 428/31554* (2015.04)

(58) Field of Classification Search
USPC ......... 524/262, 588, 589, 590, 591, 839, 871, 524/872, 873; 528/28, 38, 48, 52
See application file for complete search history.

(56) References Cited

U.S. PATENT DOCUMENTS

| | | | | | |
|---|---|---|---|---|---|
| 4,518,522 | A | * | 5/1985 | Markusch et al. | ........ 252/183.12 |
| 4,543,144 | A | * | 9/1985 | Thoma et al. | ................. 156/230 |

(Continued)

FOREIGN PATENT DOCUMENTS

| | | |
|---|---|---|
| DE | 20 2006 007 957 | 7/2006 |
| EP | 0 122 552 | 10/1984 |

(Continued)

OTHER PUBLICATIONS

English-language translation of the International Preliminary Report on Patentability (IPER) for international application PCT/EP2007/053077 mailed Oct. 15, 2009.

*Primary Examiner* — Michael L Leonard
(74) *Attorney, Agent, or Firm* — Drinker Biddle & Reath LLP

(57) ABSTRACT

Aqueous dispersions comprising
(A) at least one polyurethane,
(B) at least one compound of the general formula I a or I b

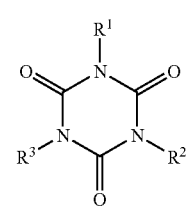

Ia

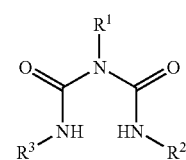

Ib in which $R^1$, $R^2$ and $R^3$ may be identical or different and are selected from $A^1$-NCO and $A^1$-NH—CO—X, in which
$A^1$ is a spacer having 2 to 20 carbon atoms and
X is selected from $O(AO)_x R^4$,
AO is $C_2$-$C_4$-alkylene oxide,
x is an integer in the range from 1 to 50 and
$R^4$ is selected from hydrogen and $C_1$-$C_{30}$-alkyl,
(C) and at least one silicone compound having reactive groups.

17 Claims, No Drawings

(56) References Cited

U.S. PATENT DOCUMENTS

| | | | |
|---|---|---|---|
| 4,853,418 A * | 8/1989 | Hanada et al. | 521/154 |
| 6,011,109 A * | 1/2000 | Brown | 524/588 |
| 6,682,779 B1 * | 1/2004 | Wefringhaus et al. | 427/314 |
| 2007/0082176 A1 | 4/2007 | Schaefer | |

FOREIGN PATENT DOCUMENTS

| | | |
|---|---|---|
| EP | 0 738 747 A1 | 10/1996 |
| EP | 1 050 551 | 11/2000 |
| WO | WO-2005/047549 A1 | 5/2005 |
| WO | WO-2008/077785 A1 | 7/2008 |

* cited by examiner

AQUEOUS DISPERSIONS AND THEIR USE FOR THE PRODUCTION OF SHEET-LIKE SUBSTRATES

CROSS REFERENCE TO RELATED APPLICATIONS

This application is a national phase of PCT/EP2008/053077, filed on Mar. 14, 2008 which claims priority to EP 07104557.9 filed Mar. 21, 2007 and EP 07104899.5 filed Mar. 26, 2007, the entire contents of all are hereby incorporated by reference.

The present invention relates to aqueous dispersions comprising
(A) at least one polyurethane,
(B) at least one compound of the general formula I a or I b

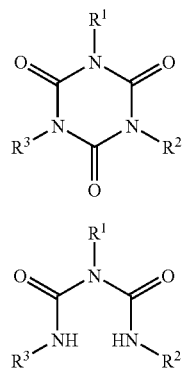

in which $R^1$, $R^2$ and $R^3$ may be identical or different and are selected from $A^1$-NCO and $A^1$-NH—CO—X, in which
$A^1$ is a spacer having 2 to 20 carbon atoms and
X is selected from $O(AO)_x R^4$,
AO is $C_2$-$C_4$-alkylene oxide,
x is an integer in the range from 1 to 50 and
$R^4$ is selected from hydrogen and $C_1$-$C_{30}$-alkyl,
(C) and at least one silicone compound having reactive groups:

Aqueous silicone-containing dispersions have numerous applications. Thus, they are used, for example, for imparting water repellency to sheet-like substrates, such as, for example, textile or leather. A specific application is the coating of leather with the aid of a reverse roll coating process as disclosed, for example, in WO 05/47549. The top layer with which the leather is coated plays a decisive role for the haptic properties.

DE 20 2006 007 957 U1 discloses that dressed leathers can be produced using silicone dispersions which have particles having a mean diameter of from 3 μm to 13 μm and which are added to a polyurethane dispersion which is applied as a top layer by the reverse roll coating process to the leather to be coated. The fastnesses, in particular the permanent handle fastnesses, of leathers coated in this manner can, however, be further improved. Moreover, the usability of the matrices can be further improved.

It was therefore the object to provide silicone dispersions which are suitable for coating substrates, in particular by the reverse roll coating process. It is furthermore the object to provide coated substrates having good fastnesses, in particular rub fastnesses, and good handle. It was furthermore the object to provide a process for the production of coated substrates which gives the abovementioned coated substrates and can be carried out advantageously.

Accordingly, the aqueous dispersions defined at the outset were found.

Aqueous dispersions according to the invention comprise (A) at least one polyurethane which is also designated as polyurethane (A) in the context of the present invention.

Polyurethane (A) is preferably a thermoplastic polyurethane. Thermoplastic polyurethanes (also referred to as TPU for short) and dispersions prepared therefrom are known as such.

Polyurethanes (A) are generally known and commercially available and generally consist of a soft phase comprising relatively high molecular weight polyhydroxy compounds, for example comprising polyester or polyether segments, and a hard urethane phase, formed from low molecular weight chain extenders and di- or polyisocyanates.

Processes for the preparation of polyurethanes (A) are generally known. In general, polyurethanes (A) are prepared by reacting
(a) isocyanates, preferably diisocyanates, with
(b) compounds reactive toward isocyanates, usually having a molecular weight ($M_w$) of from 500 to 10 000 g/mol, preferably from 500 to 5000 g/mol, particularly preferably from 800 to 3000 g/mol, and
(c) chain extenders having a molecular weight of from 50 to 499, if appropriate in the presence of
(d) catalysts
(e) and/or customary additives.

Below, the starting components and processes for the preparation of the preferred, polyurethanes (A) are to be described by way of example. The components (a), (b), (c) and, if appropriate, (d) and/or (e) usually used in the preparation of the polyurethanes are to be described below by way of example:

Isocyanates (a) used may be generally known aliphatic, cycloaliphatic, araliphatic and/or aromatic isocyanates, for example tri-, tetra-, penta-, hexa-, hepta- and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl-5-isocyanatomethylcyclohexane (isophorone diisocyanate, IPDI), 1,4- and/or 1,3-bis(isocyanatomethyl) cyclohexane (HXDI), cyclohexane 1,4-diisocyanate, 1-methylcyclohexane 2,4- and/or 2,6-diisocyanate and/or dicyclohexylmethane 4,4'-, 2,4'- and 2,2'-diisocyanate, diphenylmethane 2,2'-, 2,4'- and/or 4,4'-diisocyanate (MDI), naphthylene 1,5-diisocyanate (NDI), toluylene 2,4- and/or 2,6-diisocyanate (TDI), diphenylmethane diisocyanate, 3,3'-dimethylbiphenyl diisocyanate, 1,2-diphenylethane diisocyanate and/or phenylene diisocyanate. 4,4'-MDI is preferably used. Aliphatic diisocyanates, in particular hexamethylene diisocyanate (HDI), are also preferred, and aromatic diisocyanates, such as diphenylmethane 2,2'-, 2,4'- and/or 4,4-diisocyanate (MDI), and mixtures of the abovementioned isomers are particularly preferred.

The generally known compounds reactive toward isocyanates may be used as compounds (b) reactive toward isocyanates, for example polyesterols, polyetherols and/or polycarbonatediols, which are usually also summarized by the term "polyols", having molecular weights ($M_w$) in the range from 500 to 8000 g/mol preferably from 600 to 6000 g/mol, in particular from 800 to 3000 g/mol, and preferably an average functionality with respect to isocyanates of from 1.8 to 2.3, preferably from 1.9 to 2.2, in particular 2. Polyetherpolyols are preferably used, for example those based on generally known starter substances and customary alkylene oxides, for example ethylene oxide, 1,2-propylene oxide and/or 1,2-butylene oxide, preferably polyetherols based on polyoxytetramethylene (poly-THF), 1,2-propylene oxide and ethylene oxide. Polyetherols have the advantage that they have a higher stability to hydrolysis than polyesterols and are preferred as component (b), in particular for the preparation of soft polyurethanes (A1).

In particular, aliphatic polycarbonatediols, for example 1,4-butanediol polycarbonate and 1,6-hexanediol polycarbonate, may be mentioned as polycarbonatediols.

Polyesterdiols which may be mentioned are those which can be prepared by polycondensation of at least one primary diol, preferably at least one primary aliphatic diol, for example ethylene glycol, 1,4-butanediol, 1,6-hexanediol, neopentylglycol or particularly preferably 1,4-dihydroxymethylcyclohexane (as an isomer mixture) or mixtures of at least two of the abovementioned diols on the one hand and at least one dicarboxylic acid, preferably at least two dicarboxylic acids, or their anhydrides on the other hand. Preferred dicarboxylic acids are aliphatic dicarboxylic acids, such as adipic acid, glutaric acid, succinic acid, and aromatic dicarboxylic acids, such as, for example, phthaiic acid and in particular isophthalic acid.

Polyetherols are preferably prepared by an addition reaction of alkylene oxides, in particular ethylene oxide, propylene oxide or mixtures thereof, with diols, such as, for example, ethylene glycol, 1,2-propylene glycol, 1,2-butylene glycol, 1,4-butanediol, 1,3-propanediol, or with triols, such as, for example, glycerol, in the presence of highly active catalysts. Such highly active catalysts are, for example, cesium hydroxide and double metal cyanide catalysts, also designated as DMC catalysts. A frequently used DMC catalyst is zinc hexacyanocobaltate. The DMC catalyst can be left in the polyetherol after the reaction but is preferably removed, for example by sedimentation or filtration.

Instead of a polyol, it is also possible to use mixtures of different polyols.

For improving the dispersability, one or more diols or diamines having a carboxyl group or sulfo group (b'), in particular alkali metal or ammonium salts of 1,1-dimethylolbutanoic acid, 1,1-dimethylolpropionic acid or

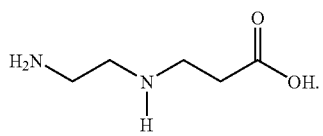

can also be used proportionately as compounds (b) reactive towards isocyanates.

Chain extenders (c) used are aliphatic, araliphatic, aromatic and/or cycloaliphatic compounds known per se and having a molecular weight of from 50 to 499 g/mol and at least two functional groups, preferably compounds having exactly two functional groups per molecule, for example diamines and/or alkanediols having 2 to 10 carbon atoms in the alkylene radical, in particular 1,3-propanediol, 1,4-butanediol, 1,6-hexanediol and/or di-, tri-, tetra-, penta-, hexa-, hepta-, octa-, nona- and/or decaalkylene glycols having 3 to 8 carbon atoms per molecule, preferably corresponding oligo- and/or polypropylene glycols, it also being possible to use mixtures as chain extenders (c).

The components (a) to (c) are particularly preferably difunctional compounds, i.e. diisocyanates (a), difunctional polyols, preferably polyetherols (b), and difunctional chain extenders, preferably diols.

Suitable catalysts (d) which accelerate in particular the reaction between the NCO groups of the diisocyanates (a) and the hydroxyl groups of the synthesis components (b) and (c) are tertiary amines known per se, such as, for example, triethylamine, dimethylcyclohexylamine, N-methylmorpholine, N,N'-dimethylpiperazine, 2-(dimethylaminoethoxy)ethanol, diazabicyclo[2.2.2]octane ("DABCO") and similar tertiary amines, and in particular organic metal compounds, such as titanic acid esters, iron compounds, such as, for example, iron(III) acetylacetonate, tin compounds, e.g. tin diacetate, tin dioctanoate, tin dilaurate and the dialkyltin salts of aliphatic carboxylic acids, such as dibutyltin diacetate, dibutyltin dilaurate or the like. The catalysts are usually used in amounts of from 0.0001 to 0.1 part by weight per 100 parts by weight of component (b).

In addition to catalysts (d), assistants and/or additives (e) can also be added to the components (a) to (c). Blowing agents, antiblocking agents, surface-active substances, fillers, for example fillers based on nanoparticles, in particular fillers based on $CaCO_3$, furthermore nucleating agents, lubricants, dyes and pigments, antioxidants, for example against hydrolysis, light, heat or discoloration, inorganic and/or organic fillers, reinforcing agents and plasticizers, metal deactivators may be mentioned by way of example. In a preferred embodiment, the component (e) also includes hydrolysis stabilizers, such as, for example, polymeric and low molecular weight carbodiimides. The soft polyurethane preferably comprises triazole and/or triazole derivative and antioxidants in an amount of from 0.1 to 5% by weight, based on the total weight of the relevant soft polyurethane. Suitable antioxidants are in general substances which inhibit or prevent undesired oxidative processes in the plastic to be protected. In general, antioxidants are commercially available. Examples of antioxidants are sterically hindered phenols, aromatic amines, thiosynergists, organophosphorus compounds of trivalent phosphorus, and hindered amine light stabilizers. Examples of sterically hindered phenols are to be found in Plastics Additive Handbook, 5$^{th}$ Edition, H. Zweifel, ed, Hanser Publishers, Munich, 2001 ([1]), pages 98-107 and page 116-page 121. Examples of aromatic amines are to be found in [1], pages 107-108. Examples of thiosynergists are given in [1], pages 104-105 and pages 112-113. Examples of phosphites are to be found in [1], pages 109-112. Examples of hindered amine light stabilizers are given in [1], pages 123-136. Phenolic antioxidants are preferably suitable for use in the antioxidant mixture. In a preferred embodiment, the antioxidants, in particular the phenolic antioxidants, have a molar mass greater than 350 g/mol, particularly preferably greater than 700 g/mol, and a maximum molar mass ($M_w$) of up to not more than 10 000 g/mol, preferably up to not more than 3000 g/mol. Furthermore, they preferably have a melting point of not more than 180° C. Furthermore, antioxidants which are amorphous or liquid are preferably used. Mixtures of two or more antioxidants can also be used as component (e).

In addition to said components (a), (b) and (c) and, if appropriate, (d) and (e), it is also possible to use chain-transfer agents (chain terminators), usually having a molecular weight of from 31 to 3000 g/mol. Such chain-transfer agents are compounds which have only one functional group reactive toward isocyanates, such as, for example, monofunctional alcohols, monofunctional amines and/or monofunctional polyols. By means of such chain-transfer agents, it is possible to establish flow behavior, in particular in the case of soft polyurethanes, in a targeted manner. Chain-transfer agents can be used in general in an amount of from 0 to 5 parts by weight, preferably from 0.1 to 1 part by weight, based on 100 parts by weight of the component (b) and by definition are included under the component (c).

In addition to said components (a), (b) and (c) and, if appropriate, (d) and (e), it is also possible to use crosslinking agents having two or more groups reactive toward isocyanate toward the end of the synthesis reaction, for example hydrazine hydrate.

For establishing the hardness of polyurethane (A), the components (b) and (c) can be chosen within relatively wide molar ratios. Molar ratios of from 10:1 to 1:10, in particular from 1:1 to 1:4, of component (b) to chain extenders (c) to be used altogether have proven useful, the hardness of the soft polyurethanes increasing with increasing content of (c). The reaction for the preparation of polyurethane (A) can be effected at an index of from 0.8 to 1.4:1, preferably at an index of from 0.9 to 1.2:1, particularly preferably at an index of from 1.05 to 1.2:1. The index is defined by the ratio of the isocyanate groups of component (a) which are used altogether in the reaction to those groups reactive toward isocyanates, i.e. the active hydrogens, of the components (b) and, if appropriate, (c) and, if appropriate, monofunctional components reactive toward isocyanates, as chain terminators, such as, for example, monoalcohols.

The preparation of polyurethane (A) can be effected by processes known per se, continuously, for example by a one-shot process or the prepolymer process, or batchwise by the prepolymer process known per se. In these processes, the components (a), (b), (c) and, if appropriate, (d) and/or (e) which are reacted can be mixed with one another in succession or simultaneously, the reaction beginning immediately.

Polyurethane (A) can be dispersed in water by methods known per se, for example by dissolving polyurethane (A) in acetone or preparing polyurethane (A) as a solution in acetone, adding water and then removing the acetone, for example by distilling off. In one variant, polyurethane (A) is prepared as a solution in N-methylpyrrolidone or N-ethylpyrrolidone, water is added and the N-methylpyrrolidone or N-ethylpyrrolidone is removed.

In one embodiment of the present invention, aqueous dispersions according to the invention comprise two different polyurethanes (A1) and (A2), of which polyurethane (A1) is a so-called soft polyurethane, which has the composition as described above for polyurethane (A), and at least one hard polyurethane (A2).

Hard polyurethane (A2) can in principle be prepared analogously to soft polyurethane (A1), but other compounds (b) reactive toward isocyanates or other mixtures of compounds (b) reactive toward isocyanates are chosen, also designated in the context of the present invention as compounds (b2) reactive toward isocyanates or compound (b2) for short.

Examples of compounds (B2) are in particular 1,4-butanediol, 1,6-hexanediol and neopentylglycol, either as a mixture with one another or as a mixture with polyethylene glycol.

In one variant of the present invention, in each case mixtures of diisocyanates are chosen as diisocyanates (a) and (a2), for example mixtures of HDI and IPDI, larger proportions of IPDI being chosen for the preparation of hard polyurethane (A2) than for the preparation of soft polyurethane (A1).

In one embodiment of the present invention, polyurethane (A2) has a Shore hardness A in the range from above 60 to not more than 100, the Shore hardness A having been determined according to DIN 53505 after 3 s.

In one embodiment of the present invention, polyurethane (A) has a mean particle diameter in the range of from 100 to 300 nm, preferably 120 to 150 nm, determined by laser light scattering.

In one embodiment of the present invention, soft polyurethane (A1) has a mean particle diameter in the range of from 100 to 300 nm, preferably from 120 to 150 nm, determined by laser light scattering.

In one embodiment of the present invention, polyurethane (A2) has a mean particle diameter in the range of from 100 to 300 nm, preferably from 120 to 150 nm, determined by laser light scattering.

Aqueous dispersions according to the invention furthermore comprise
(B) a compound of the general formula I a or I b, also referred to in the context of the present invention as compound (B) for short,

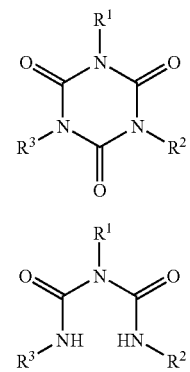

where $R^1$, $R^2$ and $R^3$ may be different or preferably identical and are selected from $A^1$-NCO and $A^1$-NH—CO—X, where A1 is a spacer having 2 to 20 carbon atoms, selected from arylene, unsubstituted or substituted by from one to four $C_1$-$C_4$-alkyl groups, alkylene and cycloalkylene, for example 1,4-cyclohexylene. Preferred spacers $A^1$ are phenylene, in particular para-phenylene, furthermore toluoylene, in particular para-toluylene, and $C_2$-$C_{12}$-alkylene, such as, for example, ethylene ($CH_2CH_2$), and furthermore —$(CH_2)_3$—, —$(CH_2)_4$—, —$(CH_2)_5$—, —$(CH_2)_6$—, —$(CH_2)_8$—, —$(CH_2)_{10}$—, —$(CH_2)_{12}$—.

X is selected from $O(AO)_xR^4$, where
AO is $C_2$-$C_4$-alkylene oxide, for example butylene oxide, in particular ethylene oxide ($CH_2CH_2O$) or propylene oxide ($CH(CH_3)CH_2O$) or ($CH_2CH(CH_3)O$),
x is an integer in the range from 1 to 50, preferably from 5 to 25, and
$R^4$ is selected from hydrogen and $C_1$-$C_{30}$-alkyl, in particular $C_1$-$C_{10}$-alkyl, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl, n-decyl, particularly preferably $C_1$-$C_4$-alkyl, such as methyl, ethyl, n-propyl, isopropyl, n-butyl, isobutyl, sec-butyl and tert-butyl.

Particularly preferred compounds (B) are those in which $R^1$ and $R^2$ and $R^3$ are in each case $(CH_2)_4$—NCO, $(CH_2)_6$—NCO or $(CH_2)_{12}$—NCO.

Aqueous dispersions according to the invention furthermore comprise in each case (C) a silicone compound having reactive groups, also referred to in the context of the present invention as silicone compound (C).

Examples of reactive groups in relation to silicone compounds (C) are, for example, carboxyl groups, carboxylic acid derivatives, such as, for example, methyl carboxylate, or carboxylic anhydrides, in particular succinic anhydride groups, and particularly preferably carboxyl groups.

Examples of reactive groups are furthermore primary and secondary amino groups, for example NH(iso-$C_3H_7$) groups, NH(n-$C_3H_7$) groups, NH(cyclo-$C_6H_{11}$) groups and NH(n-$C_4H_9$) groups, in particular NH($C_2H_5$) groups and NH($CH_3$) groups, and very particularly preferably $NH_2$ groups.

Aminoalkylamino groups, such as, for example, —NH—$CH_2$—$CH_2$—$NH_2$ groups, —NH—$CH_2$—$CH_2$—$CH_2$—$NH_2$ groups, —NH—$CH_2$—$CH_2$—NH($C_2H_5$) groups, —NH—$CH_2$—$CH_2$—$CH_2$—NH($C_2H_5$) groups, —NH—$CH_2$—$CH_2$—NH($CH_3$) groups and —NH—$CH_2$—$CH_2$—$CH_2$—NH($CH_3$) groups, are furthermore preferred. The reactive group or the reactive groups is or are bonded to silicone compound (C) either directly or preferably via a spacer $A^2$. $A^2$ is selected from arylene, unsubstituted or substituted by one to four $C_1$-$C_4$ alkyl groups, alkylene and cycloalkylene, such as, for example, 1,4-cyclohexylene. Preferred spacers $A^2$ are phenylene, in particular para-phenylene, furthermore toluoylene, in particular para-toluoylene, and $C_2$-$C_{18}$-alkylene, such as, for example, ethylene ($CH_2CH_2$), furthermore —($CH_2$)$_3$—, —($CH_2$)$_4$—, —($CH_2$)$_5$—, —($CH_2$)$_6$—, —($CH_2$)$_8$—, —($CH_2$)$_{10}$—, —($CH_2$)$_{12}$—, —($CH_2$)$_{14}$—, —($CH_2$)$_{16}$— and —($CH_2$)$_{18}$—.

In addition to the reactive groups, silicone compound (C) comprises nonreactive groups, in particular di-$C_1$-$C_{10}$-alkyl-$SiO_2$ groups or phenyl-d-$C_{10}$-alkyl-$SiO_2$ groups, in particular dimethyl-$SiO_2$ groups, and optionally one or more Si($CH_3$)$_2$—OH groups or Si($CH_3$)$_3$ groups.

In one embodiment of the present invention, silicone compound (C) has on average from one to four reactive groups per molecule.

In a specific embodiment of the present invention, silicone compound (C) has on average from one to four COOH groups per molecule.

In another specific embodiment of the present invention, silicone compound (C) has on average from one to four amino groups or aminoalkylamino groups per molecule.

Silicone compound (C) has Si—O—Si units arranged in the form of chains or in branched form.

In one embodiment of the present invention, silicone compound (C) has a molecular weight $M_n$ in the range from 500 to 10 000 g/mol, preferably up to 5000 g/mol.

If silicone compound (C) has a plurality of reactive groups per molecule, these reactive groups may be bonded—directly or via spacer $A^2$—via a plurality of Si atoms or in pairs via the same Si atom to the Si—O—Si chain.

The reactive groups or the reactive groups may be bonded to one or more of the terminal Si atoms of silicone compound (C)—directly or via spacer $A^2$. In another embodiment of the present invention, the reactive group is or the reactive groups are bonded to one or more of the nonterminal Si atoms of silicone compound (C)—directly or via spacer $A^2$.

In one embodiment of the present invention, aqueous dispersion according to the invention comprises (D) a polydi-$C_1$-$C_4$-alkylsiloxane which has neither amino groups nor COOH groups, preferably a polydimethylsiloxane, also referred to in the context of the present invention as polydialkylsiloxane (D) and polydimethylsiloxane (D), respectively, for short.

$C_1$-$C_4$-alkyl in polydialkylsiloxane (D) may be different or preferably identical and may be selected from methyl, ethyl, n-propyl, isopropyl, n-butyl, isobutyl, sec-butyl and tert-butyl, straight-chain $C_1$-$C_4$-alkyl being preferred and methyl being particularly preferred.

Polydialkylsiloxane (D) and preferably polydimethylsiloxane (D) are preferably straight-chain polysiloxanes having Si—O—Si chains or those polysiloxanes which have up to 3 branches, preferably not more than one branch, per molecule.

Polydialkylsiloxane (D) and in particular polydimethylsiloxane (D) may have one or more Si($C_1$-$C_4$-alkyl)$_2$—OH groups.

In one embodiment of the present invention, aqueous dispersion according to the invention comprises
altogether in the range from 20 to 30% by weight of polyurethane (A) or altogether in the range of from 20 to 30% by weight of polyurethanes (A1) and (A2),
in the range of from 1 to 10, preferably from 2 to 5, % by weight of compound (B),
in the range of from 1 to 10% by weight of silicone compound (C),
in the range of from zero to 5, preferably from 2 to 4, % by weight of crosslinking agent (D),
in the range of from zero to 10, preferably from 0.5 to 5, % by weight of polydialkylsiloxane (D).

Data in % by weight designate in each case the active substance or solid and are based on the total aqueous dispersion according to the invention. The lacking remainder to 100% by weight is preferably a continuous phase, for example water or a mixture of one or more organic solvents and water, at least 50% by weight being water in abovementioned mixtures. Suitable organic solvents are, for example, alcohols, such as ethanol or isopropanol, and in particular glycols, diglycols, triglycols or tetraglycols and glycols, diglycols, triglycols or tetraglycols dietherified or preferably monoetherified with $C_1$-$C_4$-alkyl. Examples of suitable organic solvents are ethylene glycol, propylene glycol, butylene glycol, diethylene glycol, triethylene glycol, tetraethylene glycol, dipropylene glycol, 1,2-dimethoxyethane, methyltriethylene glycol ("methyltriglycol") and triethylene glycol n-butyl ether ("butyltriglycol").

In one embodiment of the present invention, aqueous dispersion according to the invention comprises
in the range of from 10 to 30% by weight of soft polyurethane (A1) and
in the range of from zero to 20% by weight of hard polyurethane (A2).

In one embodiment of the present invention, aqueous dispersion according to the invention has a solids content of altogether from 5 to 60% by weight, preferably from 10 to 50% by weight and particularly preferably from 25 to 45% by weight.

In one embodiment of the present invention, aqueous dispersion according to the invention comprises at least one additive (E), selected from pigments, dulling agents, light stabilizers, antistatic agents, antisoil agents, anticreak agents, thickeners, in particular thickeners based on polyurethanes, and hollow microspheres.

In one embodiment of the present invention, aqueous dispersion according to the invention comprises altogether up to 20% by weight of additives (E).

Furthermore, a process for the preparation of aqueous dispersions according to the invention was found, also referred to in the context of the present invention as preparation process according to the invention. For carrying out the preparation process according to the invention, polyurethane (A), compound (B) and silicone compound (C) are mixed with water and optionally one or more of the above-mentioned organic solvents. Furthermore, if desired, mixing with polydialkylsiloxane (D) and additives (E) is effected. The mixing can be carried out, for example, by stirring. The sequence of addition of polyurethane (A), compound (B), silicone compound (C) and water and optionally one or more of the abovementioned organic solvents and—if desired—polydialkylsiloxane (D) and additives (E) is arbitrary.

A polyurethane (A) dispersed in water or in a mixture of water and organic solvent or dispersed soft polyurethane (A1) and hard polyurethane (A2) is preferably used as starting material, and compound (B) and silicone compound (C) and, if desired, polydialkylsiloxane (D) and optionally one or more organic solvents are added, preferably with stirring.

In a specific embodiment of the preparation process according to the invention, thickener, as an example of an additive (E), is added last and the desired viscosity is thus established.

The present invention furthermore relates to the use of aqueous dispersions according to the invention for the production of multilayer sheet-like substrates. The present invention furthermore relates to a process for the production of multilayer sheet-like substrates using aqueous dispersions according to the invention, also referred to in the context of the present invention as coating process according to the invention. The present invention furthermore relates to multilayer sheet-like substrates produced using aqueous dispersions according to the invention.

For the production of multilayer sheet-like substrates according to the invention, sheet-like substrates are used as starting materials. Sheet-like substrates may be, for example, plastic films, for example comprising polyethylene, polypropylene, polyester, polycarbonate, polystyrene or polyvinyl chloride. Sheet-like substrates are preferably selected from textile, for example mats, knitted fabrics, laid webs, nets, knitwear, woven fabrics and in particular nonwovens, synthetic suede materials having a top consisting of microfibers. Further suitable sheet-like substrates are moldings comprising plastic, for example dashboards, furthermore imitation leather and very particularly preferably leather, leather also including split leather and leather having rawhide defects. Leather may be tanned by any method, for example with chromium (III) compounds or in the absence of chromium, and may be attributable to any animal hide, in particular to cattle, it is unimportant whether the animal from whose hide leather used in the process according to the invention has been made was slaughtered or has died owing to accidents or natural causes, for example, diseases.

If it is desired to use leather as a sheet-like substrate, the flesh side or the grain side can be coated with dispersion according to the invention.

In one embodiment of the present invention, sheet-like substrate is coated with dispersion according to the invention and then curing is effected, for example by thermal treatment.

In a preferred embodiment of the present invention, the sheet-like substrate is coated by a reverse roll coating process, as described, for example, in WO 05/47549.

In a particularly preferred embodiment of the present invention, the following procedure is adopted. In a first step, a sheet-like body is produced from a material, preferably from metal, plastic or in particular a silicone, in particular a silicone rubber. In a second step, a structure is imparted to the sheet-like body, for example by embossing and preferably by treatment with the aid of a laser. The structure preferably corresponds to the grain structure of a leather, for example of a cattle, calf or crocodile leather or to the surface structure of a nubuk leather. In one variant of the present invention, the structure may have a fantasy structure, or logos can be produced by embossing. In a specific embodiment, the structure has not only the grain structure of a leather, for example of a cattle, calf or crocodile leather, but additionally fine indentations having a maximum depth of 200 µm, preferably from 60 to 100 µm, and a mean diameter in the range of from 10 to 30 µm. The pattern of the indentations may then correspond to a cattle, calf or crocodile leather.

In one embodiment of the present invention, the sheet-like body has a thickness in the range of from 0.5 to 5 mm, preferably from 1 to 3 mm.

In the third step of the coating process according to the invention, a procedure is preferably adopted in which aqueous dispersion according to the invention is applied to the structured body, for example by atomizing, spraying, pouring, knife coating, coating or roll coating.

For example, from 10 to 100 g/m$^2$, preferably from 50 to 75 g/m$^2$, of aqueous dispersion according to the invention can be applied to the sheet-like body.

In one embodiment of the present invention, the sheet-like body is at room temperature. Preferably, however, it is at a temperature which is higher than room temperature, in particular in the range of from 35 to 90° C. A greater solidification of the coating by aqueous dispersion according to the invention is effected thereby.

In a fourth step, the solidified coating is then transferred to a sheet-like substrate. The transfer can be effected manually or preferably mechanically, in particular in such a way that the sheet-like body has been connected to a roller or roll, and the coating is now transferred to the relevant sheet-like substrate with the aid of the sheet-like body applied to a roller or roll. A multilayer substrate according to the invention is obtained. The solidified coating produced from aqueous dispersion according to the invention serves as a top layer in the multilayer substrate according to the invention and, in the context of the present invention, may also be designated as top layer.

In a further step, the adhesion of transferred layer and sheet-like substrate can be improved by also thermally treating or compressing the freshly produced multilayer substrate according to the invention or carrying out a combination of the abovementioned steps.

It is observed that, on carrying out the coating process according to the invention, the sheet-like body declines in quality only extremely slowly, for example as a result of soiling.

Multilayer substrates according to the invention have as a whole advantageous properties, for example good breathability, very good fastnesses during use, such as, for example, rub fastnesses, and a very good handle.

In a preferred embodiment of the present invention, the coating produced with the use of aqueous dispersion according to the invention is not transferred directly to the sheet-like substrate but another bonding layer is first applied to the solidified coating as long as it is still present on the sheet-like body, for example the roller or the roll, and coating produced with the use of aqueous dispersion according to the invention and bonding layer are transferred together to the sheet-like substrate.

In a particularly preferred embodiment of the present invention, the coating produced with the use of aqueous dispersion according to the invention is not transferred directly to the sheet-like substrate but a bonding layer is first applied to the solidified coating as long as it is still present on the body, and a second bonding layer is applied to the sheet-like substrate, the two bonding layers having substantially the same composition, and coating produced with the use of aqueous dispersion according to the invention and bonding layer are transferred together to the sheet-like substrate already provided with the bonding layer.

The bonding layer or the bonding layers having substantially the same composition are, for example, layers which are obtained by applying preferably one or more aqueous formulations, the relevant aqueous formulations having the following composition:

(α) at least one polyurethane, which may be identical to or different from polyurethane (A),
(β) at least one compound of the general formula I a or I b, which is defined as above, also referred to as compound (β) for short; compound (B) and compound (β) are preferably identical,
(γ) preferably at least one binder, for example a (meth)acrylate binder or a polyurethane binder, preferably a copolymer of (meth)acrylic acid, also referred to in the context of the present invention as binder (γ). Binder (γ) is preferably a copolymer of (meth)acrylic acid and at least one $C_1$-$C_{10}$-alkyl ester of (meth)acrylic acid,
(δ) if appropriate, at least one additive, for example selected from pigments, handle agents, thickeners, antistatic agents and dulling agents.

The remainder is preferably water.

Preferably, the aqueous formulation or the aqueous formulations from which it is desired to produce the top layer(s) comprises or comprise a silicone compound, such as, for example, silicone compound (C), or such as polydialkylsiloxane (D).

In one embodiment of the present invention, the aqueous formulation or the aqueous formulations from which it is desired to produce the top layer(s) comprises or comprise at least one soft polyurethane (α1) and at least one hard polyurethane (α2), which in each case may be different from or preferably identical to soft polyurethane (A1) or hard polyurethane (A2).

The aqueous formulation or the aqueous formulations from which it is desired to produce the top layer(s) may comprise one or more organic solvents. Examples of organic solvents are alcohols, such as ethanol or isopropanol, and in particular glycols, diglycols, triglycols or tetraglycols and glycols, diglycols, triglycols or tetraglycols dietherified or preferably monoetherified with $C_1$-$C_4$-alkyl. Examples of suitable organic solvents are ethylene glycol, propylene glycol, butylene glycol, diethylene glycol, triethylene glycol, tetraethylene glycol, dipropylene glycol, 1,2-dimethoxyethane, methyltriethylene glycol ("methyltriglycol") and triethylene glycol n-butylether ("butyltriglycol").

In one embodiment of the present invention, the aqueous formulation or the aqueous formulations from which it is desired to produce the top layer(s) has or have the following composition:
altogether in the range of from 20 to 30% by weight of polyurethane (α),
in the range of from 1 to 5, preferably from 2 to 3, % by weight of compound (β),
in the range of up to 20% by weight of binder (γ),
in the range of from zero to altogether 20% by weight of additive(s) (δ),
and preferably neither silicone compound (C) nor polydialkylsiloxane (D).

In one embodiment of the present invention, the aqueous formulation or the aqueous formulations for which it is desired to produce the top layer(s) comprises or comprise in the range of 10 to 30% by weight of soft polyurethane (α1) and in the range of from zero to 20% by weight of hard polyurethane (α2).

Data in % by weight designate in each case the active substance or solid and are based on the total aqueous formulation used in the coating process according to the invention. The remainder lacking to 100% by weight is preferably a continuous phase, for example water or a mixture of one or more organic solvents and water, at least 50% by weight of water being present in abovementioned mixtures.

The thickness of the top layers may be in the range of from 5 to 50 μm, preferably from 10 to 30 μm.

The application can be effected, for example, by atomization, spraying, pouring, knife coating, coating or roll coating.

The bonding of the layers can be improved or accelerated by customary methods, for example by thermal treatment and from 80 to 120° C. and/or pressing together at a contact pressure in the range of from 1.5 to 3 bar.

Multilayer substrates according to the invention are suitable for the production of, for example, pieces of furniture and in particular interior automobile parts, in particular automobile seats, and furthermore of shoes, textiles and pieces of furniture. They have good fastness and moreover excellent breathability. The present invention therefore furthermore relates to interior automobile parts, shoes, textiles and pieces of furniture, produced using multilayer substrates according to the invention.

The invention is illustrated by working examples.

General remark: data in % by weight are tel quel.

I. Preparation of Aqueous Dispersions According to the Invention

I.1 Preparation of an Aqueous Dispersion Disp.1 According to the Invention.

The following were mixed in a stirred vessel with stirring:
7% by weight of an aqueous dispersion (particle diameter: 125 nm, solids content: 40%) of a soft polyurethane (A1.1), prepared from hexamethylene diisocyanate (a1.1) and isophorone diisocyanate (a1.2) in the weight ratio 13:10 as diisocyanates and, as diols, a polyesterdiol (b1.1) having a molecular weight $M_w$ of 800 g/mol, prepared by polycondensation of isophthalic acid, adipic acid and 1,4-dihydroxymethylcyclohexane (isomer mixture) in a molar ratio of 1:1:2, 5% by weight of 1,4-butanediol (b1.2) and 3% by weight of monomethylated polyethylene glycol (c.1) and 3% by weight of $H_2N-CH_2CH_2-NH-CH_2CH_2-COOH$, % by weight in each case based on polyesterdiol (b1.1), Softening point of soft polyurethane (A1.1): 62° C., softening begins at 55° C., Shore hardness A 54,
65% by weight of an aqueous dispersion (particle diameter: 150 nm) of a hard polyurethane (A2.1), obtainable by reacting isophorone diisocyanate (a1.2), 1,4-butanediol (b1.2) and $H_2N-CH_2CH_2-NH-CH_2CH_2-COOH$, softening point of 195° C., Shore hardness A 86,
3.5% by weight of a 70% by weight solution (in propylene carbonate) of compound (B.1).

(B.1)

[chemical structure: isocyanurate trimer of hexamethylene diisocyanate]

NCO content 12%,
6% by weight of a 65% by weight aqueous dispersion of the silicone compound according to example 2 from EP-A 0 738 747 (C.1),
2% by weight of carbon black,
0.5% by weight of a polyurethane-based thickener.

Aqueous dispersion Disp.1 according to the invention was obtained with a solids content of 35% and a kinematic viscosity of 25 sec at 23° C., determined according to DIN EN ISO 2431, effective date May 1996.

I.2 Preparation of an Aqueous Dispersion Disp.2 According to the Invention

The following were mixed in a stirred vessel with stirring: 7% by weight of an aqueous dispersion (particle diameter: 125 nm, solids content: 40%) of a soft polyurethane (A1.1), prepared from hexamethylene diisocyanate (a1.1) and isophorone diisocyanate (a1.2) in the weight ratio of 13:10 as diisocyanates and, as diols, a polyesterdiol (b1.1) having a molecular weight $M_w$ of 800 g/mol, prepared by polycondensation of isophthalic acid, adipic acid and 1,4-dihydroxymethylcyclohexane (isomer mixture) in a molar ratio of 1:1:2, 5% by weight of 1,4-butanediol (b1.2), and 3% by weight of monomethylated polyethylene glycol (c.1) and 3% by weight of $H_2N-CH_2CH_2-NH-CH_2CH_2-COOH$, % by weight in each case based on polyesterdiol (b1.1), Softening point of soft polyurethane (A1.1): 62° C., softening begins at 55° C., Shore hardness A 54, 65% by weight of an aqueous dispersion (particle diameter: 150 nm) of a hard polyurethane (A2.2), obtainable by reacting isophorone diisocyanate (a1.2), 1,4-butanediol (b1.2), 1,1-dimethylolpropionic acid, hydrazine hydrate and polypropylene glycol having a molecular weight $M_w$ of 4200 g/mol (b1.3), polyurethane (A2.2) had a softening point of 195° C., Shore hardness A 86, 3.5% by weight of a 70% by weight solution (in propylene carbonate) of compound (B.1).

6% by weight of a 65% by weight aqueous dispersion of the silicone compound according to example 2 from EP-A 0 738 747 (C.1), 2% by weight of carbon black, 0.5% by weight of a polyurethane-based thickener.

Aqueous dispersion Disp.2 according to the invention was obtained with a solids content of 35% and a kinematic viscosity of 25 sec at 23° C., determined according to DIN EN ISO 2431, effective date May 1996.

II. Production of a Sheet-Like Body

A laser-engraveable silicone polymer layer having a smooth surface and based on a room temperature-curing filler-containing 2-component silicone elastomer was produced by thoroughly mixing the two components with one another and applying them with the aid of knife coating to a temporary PET cover sheet. The silicone layer was allowed to cure for 16 hours at room temperature. The elastomeric silicone layer chemically strengthened in this manner was fixed with the aid of a silicone adhesive on a woven polyester fabric as a carrier element. The strengthened elastomeric polymer layer with woven fabric carrier, obtained after removal of the temporary PET cover sheet, had a total layer thickness of 1.7 mm. The sheet-like body obtained (not structured) was converted into sheet segments measuring about 40×100 cm before the subsequent structuring by means of a laser.

For structuring the sheet-like body, a $CO_2$ laser engraving machine of the BDE 4131 type (from Stork Prints Austria GmbH, Kufstein) was used. The machine has 3 sealed $CO_2$ lasers having a rated power of 250 W each, the corresponding optical components and the associated peripherals for control, laser cooling, exhaust air collection and exhaust air treatment. The cylindrical recording system consisted either of a thin-walled cylindrical metal drum or of metal cones in which a so-called printing sleeve, consisting of a cylindrical hollow cylinder (generally composed of a plurality of layers) comprising one or more plastics, is clamped. The laser control was effected via a connected control computer by means of special output software. The output software interprets the motif, present as a grayscale bitmap, as a height profile pixel by pixel. Each grayscale corresponds to a certain engraved depth or engraving power at the relevant point of the motif. Ideally, the relationship between grayscale value and engraved depth is set to be approximately linear.

The sheet-like body (not structured) was present as planar layer and was fixed on a cylindrical holding element for the duration of the engraving. During the engraving process, the rotating cylindrical holding element with the matrix to be processed was moved uniformly relative to the laser beam in the axial direction. In this way, the laser beam passed over the total surface of the sheet-like body, which surface is to be processed.

The sheet-like body (not structured) according to example II. was engraved with a motif which consisted of a combination of the following two individual motifs according to Table 1.

TABLE 1

Individual motifs of the motif on the sheet-like body (structured)

| Individual motif no. | Function | Motif type |
|---|---|---|
| 1 | Wells | Wells with Diameter = 72 µm Center-to-center distance = 100 µm (in the form of an inverted halftone screen of 100 l/cm = 254 lpi at a tonal value of 40%) |
| 2 | Microroughness | Roughness pattern Roughness amplitude = 30 µm Roughness frequency = 30 µm | lpi = lines per inch

In this way, a sheet-like body (structured) having a rough surface and about 10 000 wells/cm² was obtained. The depth of the engraved wells was about 80 µm. The sheet-like body (structured) was subsequently cleaned with the aid of a water-surfactant mixture and used directly for the coating process according to the invention.

III. Preparation of Aqueous Formulations for the Top Layer

III.1 Preparation of an Aqueous Formulation AF.1 According to the Invention

The following were mixed in a stirred vessel with stirring: 7% by weight of an aqueous dispersion (particle diameter: 125 nm), solids content: 40%) of a soft polyurethane (α1.1), prepared from hexamethylene diisocyanate (a 1.1) and isophorone diisocyanate (a1.2) at the weight ratio 13:10 as diisocyanates and, as diols, a polyesterdiol (b1.1) having a molecular weight $M_w$ of 800 g/mol, prepared by polycondensation of isophthalic acid, adipic acid and 1,4-dihydroxymethylcyclohexane (isomer mixture) in a molar ratio of 1:1:2, 5% by weight of 1,4-butanediol (b1.2), 3% by weight of monomethylated polyethylene glycol (c.1) and 3% by weight $H_2N-CH_2CH_2-NH-CH_2CH_2-COOH$, % by weight in each case based on polyesterdiol (b1.1), Softening point of 62° C., softening begins at 55° C., Shore hardness A 54, 65% by weight of an aqueous dispersion (particle diameter: 150 nm) of a hard polyurethane (α2.1), obtainable by reacting isophorone diisocyanate (a1.2), 1,4-butanediol (b1.2) and $H_2N-CH_2CH_2-NH-CH_2CH_2-COOH$, softening point of 170° C., Shore hardness A 90, 3.5% by weight of a 70% by weight solution (in propylene carbonate) of compound (β.1), NCO content 12%, 2% by weight of carbon black.

Aqueous formulation AF.1 was obtained.

Remark: compound (B.1) was identical to compound (β.1).

III.2 Preparation of an Aqueous Formulation AF.2 According to the Invention

The following were mixed in a stirred vessel with stirring: 7% by weight of an aqueous dispersion (particle diameter: 125 nm), solids content: 40%) of a soft polyurethane (α1.1), prepared from hexamethylene diisocyanate (a1.1) and isophorone diisocyanate (a1.2) at the weight ratio 13:10 as diisocyanates and, as diols, a polyesterdiol (b1.1) having a molecular weight $M_w$ of 800 g/mol, prepared by polycondensation of isophthalic acid, adipic acid and 1,4-dihydroxymethylcyclohexane (isomer mixture) in a molar ratio of 1:1:2, 5% by weight of 1,4-butanediol (b1.2), 3% by weight of monomethylated polyethylene glycol (c.1) and 3% by weight $H_2N—CH_2CH_2—NH—CH_2CH_2—COOH$, % by weight in each case based on polyesterdiol (b1.1), Softening point of 62° C., softening begins at 55° C., Shore hardness A 54, 65% by weight of an aqueous dispersion (particle diameter: 150 nm) of a hard polyurethane (α2.2), obtainable by reacting isophorone diisocyanate (a1.2), 1,4-butanediol (b1.2), 1,1-dimethylolpropionic acid, hydrazine hydrate and polypropylene glycol having a molecular weight $M_w$ of 4200 g/mol (b1.3), polyurethane (α2.2) had a softening point of 195° C., Shore hardness A 90, 3.5% by weight of a 70% by weight solution (in propylene carbonate) of compound (β.1), NCO content 12%, 2% by weight of carbon black.

The aqueous dispersion AF.2 according to the invention was obtained with a solids content of 35% and a kinematic viscosity of 25 sec determined at 23° C. according to DIN EN ISO 2431, effective date May 1996.

IV. Application of Dispersions According to the Invention to Sheet-Like Bodies from II.

The sheet-like body was placed on a heatable surface and heated to 80° C. Thereafter, Disp.1 or Disp.2 was sprayed on by a plurality of spray nozzles, in each case 60 g/m² (wet). Solidification was allowed to take place at 80° C. until the surface was no longer tacky. A sheet-like body coated with a top layer was obtained.

V. Application of Bonding Layer to Leather and to Sheet-Like Bodies from IV which were Coated with a Top Layer and Application of Coatings of the Coated Sheet-Like Body to Leather.

AF.1 or AF.2 was applied, at 70 g/m² (wet), by means of 2 spray nozzles analogously to IV to the sheet-like body from IV which was coated with a top layer. Drying was allowed to take place in an air dryer at 80° C. until the surface was no longer tacky. A sheet-like body coated with a top layer and a bonding layer was obtained.

AF.1 or AF.2 was applied with the aid of a spray gun to cattle nappa leather tanned conventionally with chromium (III), in an amount of 50 g/m² (wet). Storage was effected for two minutes at room temperature, after which the coated cattle nappa leather had a dry feel.

The coated cattle nappa leather was then placed with the coating facing downward on the sheet-like body coated with a top layer and a bonding layer and pressing was effected in a heated press (90° C.) with the aid of pressure-elastic supports at a pressure of 2 bar over a period of 15 seconds. A coated cattle nappa leather L.1 according to the invention was obtained.

The sheet-like body (uncoated) could be removed easily and completely from the coated cattle nappa leather L.1 or L.2 according to the invention and used again immediately.

Cattle nappa leathers L.1 and L.2 according to the invention had the following properties:

Adhesive strength based on DIN EN ISO 11644 with a cyanoacrylate adhesive: dry value: 21.3 N/cm, wet value: 10.3 N/cm or 10.5 N/cm Rub fastnesses based on DIN EN ISO 11640:

Gasoline rub fastness, tested with petroleum ether: rating 5 for 20×

Neutral soap rub fastness: rating 5 for 100×

Solvent rub fastness, tested with ethanol: rating 5

Wet rub fastness, rating 4 to 5 for 500×

Perspiration rub fastness: rating 5 for 100×

Dry rub fastness: rating 5 for 2000×

VI. Coating of a Nonwoven

A nonwoven (polyester) and a sheet-like body (structured) according to II were used as starting materials.

VI.1 Preparation of Aqueous Dispersions Disp.3 and Disp.4 According to the Invention The following were mixed in a stirred vessel with stirring:

10% by weight of an aqueous dispersion (particle diameter: 125 nm) of a thermoplastic polyurethane (A1.1), prepared from hexamethyl diisocyanate (a 1.1) and isophorone diisocyanate (a1.2) in the weight ratio 13:10 as diisocyanates and, as diols, a polyester diol (b1.1) having a molecular weight $M_w$ of 800 g/mol, prepared by polycondensation of isophthalic acid, adipic acid and 1,4-dihydroxymethylcyclohexane (isomer mixture) in a molar ratio of 1:1:2, 5% by weight of 1,4-butanediol (b1.2), 3% by weight of monomethylated polyethylene glycol (c.1) and 3% by weight of $H_2N—CH_2CH_2—NH—CH_2CH_2—COOH$, % by weight in each case based on polyesterdiol (b1.1), softening point of 62° C., softening begins at 55° C., Shore hardness A 54, 60% by weight of an aqueous dispersion (particle diameter: 150 nm) of a hard polyurethane (A1.2), obtainable by reacting isophorone diisocyanate, 1,4-butanediol and $H_2N—CH_2CH_2—NH—CH_2CH_2—COOH$, Shore hardness A 86, 3.5% by weight of a 70% by weight solution (in propylene carbonate) of compound (B.1) (see above), NCO content 12%, 6% by weight of a 60% by weight aqueous dispersion of the silicone compound according to example 2 from EP-A 0 738 747 (C.1), 2% by weight of carbon black, 0.5% by weight of a polyurethane-based thickener, 1% by weight of hollow microspheres, mean diameter 20 μm, comprising polyvinylidene chloride, filled with isobutane, 15% by weight of silica gel.

Aqueous dispersion Disp.3 according to the invention was obtained with a solids content of 30% and a kinematic viscosity of 25 sec at 23° C., determined according to DIN EN ISO 2431, effective date May 1996.

The following were mixed in a stirred vessel with stirring: 10% by weight of an aqueous dispersion (particle diameter: 125 nm) of a thermoplastic polyurethane (A1.1), prepared from hexamethyl diisocyanate (a 1.1) and isophorone diisocyanate (a1.2) in the weight ratio 13:10 as diisocyanates and, as diols, a polyester diol (b1.1) having a molecular weight $M_w$ of 800 g/mol, prepared by polycondensation of isophthalic acid, adipic acid and 1,4-dihydroxymethylcyclohexane (isomer mixture) in a molar ratio of 1:1:2, 5% by weight of 1,4-butanediol (b1.2), 3% by weight of monomethylated polyethylene glycol (c.1) and 3% by weight of $H_2N—CH_2CH_2—NH—CH_2CH_2—COOH$, % by weight in each case based on polyesterdiol (b1.1), softening point of 62° C., softening begins at 55° C., Shore hardness A 54, 60% by weight of an aqueous dispersion (particle diameter: 150 nm) of a hard polyurethane (A2.2), obtainable by reacting isophorone diisocyanate, 1,4-butanediol, 1,1-dimethylolpropionic acid, hydrazine hydrate and polypropylene glycol having a molecular weight $M_w$ of 4200 g/mol, softening point of 195° C., Shore hardness A 86, 3.5% by weight of a 70% by weight solution (in propylene carbonate) of compound (B.1) (see above), NCO content 12%, 6% by weight of a 60% by weight aqueous dispersion of the silicone compound according to example 2 from EP-A 0 738 747 (C.1), 2% by weight of carbon black, 0.5% by weight of a polyurethane-based thickener, 1% by weight of hollow microspheres, mean diameter 20 μm, comprising polyvinylidene chloride, filled with isobutane, 15% by weight of silica gel.

Aqueous dispersion Disp.4 according to the invention was obtained with a solids content of 30% and a kinematic viscosity of 25 sec at 23° C., determined according to DIN EN ISO 2431, effective date May 1996.

VI.2 Application of Dispersions According to the Invention to Sheet-Like Bodies from II.

The sheet-like body from II. was placed on a heatable surface and heated to 80° C. Disp.3 or Disp.4 was then sprayed on through a plurality of spray nozzles, at 80 g/m² (wet). Solidification was allowed to take place at 80° C. until the surface was no longer tacky. Sheet-like bodies coated with a top layer were obtained.

AF.1 or AF.2 was applied through spray nozzles analogously to V. to sheet-like bodies from VI. which were coated with a top layer, in each case 50 g/m² (wet). Drying was allowed to take place in an air dryer at 80° C. until the surface was no longer tacky. Sheet-like bodies coated with a top layer and a bonding layer were obtained.

AF.1 or AF.2 was applied to a nonwoven, in each case 50 g/m² (wet). Storage was effected for two minutes at room temperature, after which the coated nonwovens had a dry feel.

Thereafter, the coated nonwovens were placed with the coating facing downward on the sheet-like bodies coated with a top layer and a bonding layer and were pressed in a heated press (90° C.) with the aid of pressure-elastic supports at a pressure of 2 bar over a period of 15 seconds. Coated nonwovens NW.1 and NW.2 according to the invention were obtained.

The sheet-like body (uncoated) could be removed easily and completely from coated nonwoven NW.1 or NW.2 according to the invention and used again immediately. Nonwovens NW.1 and NW.2 coated according to the invention were resilient, breathable and dimensionally stable and had a very good handle.

We claim:

1. An aqueous dispersion comprising
   (A) at least one polyurethane,
   (B) at least one compound of the general formula I a or I b

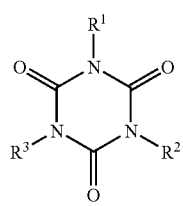

Ia

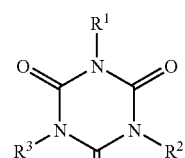

Ib

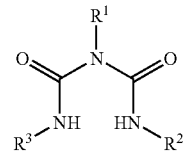

in which $R^1$, $R^2$ and $R^3$ may be identical or different and are selected from $A^1$-NCO and $A^1$-NH—CO—X, in which
$A^1$ is a spacer having 2 to 20 carbon atoms and
X is selected $O(AO)_xR^4$,
AO is $C_2$-$C_4$-alkylene oxide,
x is an integer in the range from 1 to 50 and
$R^4$ is selected from hydrogen and $C_1$-$C_{30}$-alkyl,
(C) and at least one silicone compound having reactive groups,
said silicone compound (C) is selected from silicone compounds having one to four amino groups per molecule, silicone compounds having one to four aminoalkylamino groups per molecule and silicone compounds having one to four COOH groups per molecule.

2. The aqueous dispersion according to claim 1, wherein AO is selected from ethylene oxide and propylene oxide.

3. The aqueous dispersion according to claim 1, which additionally comprises
   (D) at least one polydi-$C_1$-$C_4$-alkylsiloxane which has neither amino groups nor COOH groups.

4. The aqueous dispersion according to claim 1, wherein $A^1$ is selected from phenylene, toluylene and $C_2$-$C_{12}$-alkylene.

5. A process for preparing aqueous dispersions according to claim 1 comprising combining the at least one polyurethane (A), the at least one compound (B), and the at least one silicone compound (C).

6. A process for the production of multilayer sheet-like substrates comprising utilizing aqueous dispersions according to claim 1.

7. The process according to claim 6, wherein a sheet-like body is produced from a silicone in a first step and is provided with a structure in a second step, aqueous dispersion comprising
   (A) at least one polyurethane,
   (B) at least one compound of the general formula I a or I b Ia

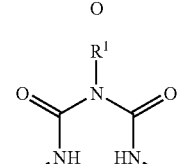

Ib in which $R^1$, $R^2$ and $R^3$ may be identical or different and are selected from $A^1$-NCO and $A^1$-NH—CO—X, in which
$A^1$ is a spacer having 2 to 20 carbon atoms and X is selected $O(AO)_xR^4$, AO is $C_2$-$C_4$-alkylene oxide, x is an integer in the range from 1 to 50 and $R^4$ is selected from hydrogen and $C_1$-$C_{30}$-alkyl, and at least one silicone compound having reactive groups, said silicone compound (C) is selected from silicone compounds having one to four amino groups per molecule, silicone compounds having one to four aminoalkylamino groups per molecule and silicone compounds having one to four COOH groups per molecule, is applied to the structured body in the third step and the layer from the abovementioned steps is transferred onto a sheet-like substrate in a fourth step.

8. A multilayer sheet-like substrate produced by the process according to claim 6.

9. The multilayer sheet-like substrate according to claim 8, wherein the sheet-like substrate is selected from plastic films, leather, imitation leather, textile and moldings comprising plastic.

10. An interior automobile part, shoe, textile or piece of furniture produced using multilayer sheet-like substrates according to claim 8.

11. The aqueous dispersion according to claim 2, which additionally comprises (D) at least one polydi-$C_1$-$C_4$-alkylsiloxane which has neither amino groups nor COOH groups.

12. The aqueous dispersion according to claim 2, wherein $A^1$ is selected from phenylene, toluylene and $C_2$-$C_{12}$-alkylene.

13. The aqueous dispersion according to claim 3, wherein $A^1$ is selected from phenylene, toluylene and $C_2$-$C_{12}$-alkylene.

14. A process for preparing aqueous dispersions according to claim 2 comprising combining the at least one polyurethane (A), the at least one compound (B), and the at least one silicone compound (C).

15. A process for the production of multilayer sheet-like substrates comprising utilizing aqueous dispersions according to claim 2.

16. A process for the production of multilayer sheet-like substrates comprising utilizing aqueous dispersions according to claim 3.

17. A process for the production of multilayer sheet-like substrates comprising utilizing aqueous dispersions according to claim 4.

* * * * *